UNITED STATES PATENT OFFICE.

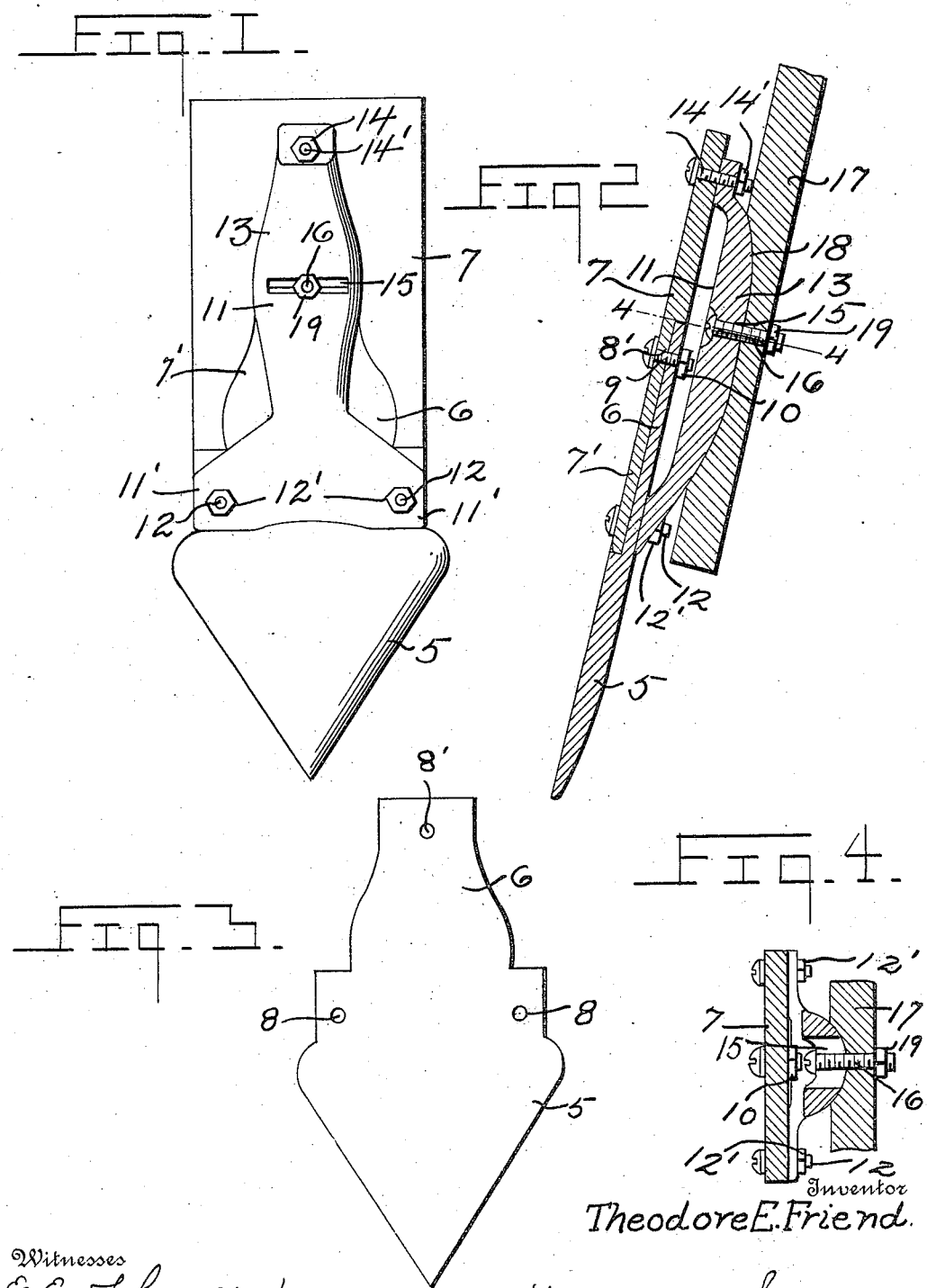

THEODORE E. FRIEND, OF SAIDORA, ILLINOIS.

DETACHABLE POINT FOR CULTIVATOR-SHOVELS.

944,484.　　　Specification of Letters Patent.　　Patented Dec. 28, 1909.

Application filed August 31, 1909.　Serial No. 515,413.

*To all whom it may concern:*

Be it known that I, THEODORE E. FRIEND, a citizen of the United States, residing at Saidora, in the county of Mason and State of Illinois, have invented certain new and useful Improvements in Detachable Points for Cultivator-Shovels, of which the following is a specification.

This invention has relation to certain new and useful improvements in cultivator shovel points, and more particularly to a point which is adapted to be removably attached and secured to the shovel.

The primary object of my invention is to provide a device of the above character which may be rigidly secured in position in such a manner as to preserve the maximum strength and durability of the shovel points, while at the same time allowing of their quick removal when the points become worn or broken and it is necessary to replace them with new ones.

Another object is to provide a detachable shovel point, the attaching means whereby the points are secured to the shovel providing convenient means for mounting the shovels on the machine, whereby an angular adjustment of the points with relation to each other may be obtained.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a bottom plan view of a shovel with the point attached thereto. Fig. 2 is a vertical longitudinal section showing the manner of mounting the shovel on the bed plate. Fig. 3 is a detail view of the shovel point. Fig. 4 is a section taken on the line 4—4 of Fig. 2.

In the usual cultivator construction, the shovel and the cultivator point are integrally formed, and when the points become worn or broken, the entire shovel must be removed from the machine and replaced by a new one. It is the purpose of my present invention to overcome this defect and others incident to the present construction of devices of this character. I have therefore devised a cultivator point which is detachably secured to the shovel, in such a manner as to secure the utmost rigidity and strength, thus providing a shovel which is as serviceable and durable as though the points were integrally formed therewith. To this end I provide the cultivator point 5 which is formed with a reduced extension 6. The extension 6 is adapted to be received in the recess 7' provided in the under face of the shovel 7, and when so positioned will be flush therewith. The point 5 is provided adjacent to the opposite edges thereof with the bolt openings 8, which register with similar openings formed in the shovel when the point is in position. At the rear end of the shovel point a similar bolt opening 8' is provided through which extends the bolt 9 upon the end of which a securing nut 10 is threaded. An attaching plate 11 is disposed over the extension 6 of the shovel point, and the forward end thereof is laterally extended upon either side of the longitudinal center of the shovel. These extended portions 11' of the plate are provided with openings adapted to register with the bolt opening 8 in the shovel point. Through the alined openings of the shovel, the point and the clamping plate, securing bolts 12 are extended and nuts 12' engaged upon the ends thereof to securely clamp the various parts together. The plate 11 is reduced beyond the extensions and has a convexed outer surface as shown at 13. The extreme end of the plate is also secured to the shovel by the bolt 14 and nut 14'. It will be noted that the reduced convexed portion of the clamping plate 11 is spaced from the under surface of the shovel. A transverse slot 15 is formed centrally of the reduced portion 13 of the plate, and a connecting bolt 16 is positioned therein. One end of this bolt is headed and positioned between the shovel and the plate.

The bolt 16 is adapted to extend through a bed plate 17 carried by the machine, upon which the shovels are mounted. This plate is provided with substantially semi-circular grooves 18 to receive the convexed portion of the attaching plates 11. It will thus be seen that a transverse rocking movement of the shovels and plow points secured thereto is provided for, whereby the points may be so adjusted with relation to each other that the soil may be turned as desired. The nut 19 has threaded engagement upon the end of the bolt 16 whereby the shovel may be securely held in its adjusted position.

From the foregoing it will be seen that I have provided a detachable shovel point which may be quickly attached or detached to or from the shovel, and is secured thereto in such a manner that the maximum strength and rigidity of the points may be retained, while a much less expensive device is provided.

By the use of a shovel point as above described, the necessity for replacing the entire shovel when it becomes broken and is no longer of service, is removed and the points which constitute the most expensive element of the shovel construction may alone be discarded and a new one quickly be attached to the shovel. Thus considerable loss of time and money is obviated and all of the advantageous features of the present constructions of cultivator shovels are retained. The device comprises but two separate elements which may be formed of cast metal, thus providing for the inexpensive manufacture of the same without sacrificing the strength or other essential requirements of devices of this character.

What is claimed is:

1. In a device of the class described the combination with a cultivator shovel, of a cultivator point attached thereto and arranged flush with the under surface of the shovel, a clamping plate disposed upon the shovel and point adapted to secure the point in position, an attaching bolt extending through said plate, said bolt being adapted to secure the shovel and point upon the bed plate of the cultivator, and a nut engaged upon the end of said bolt to secure the shovel in position.

2. In a device of the class described the combination with a cultivator shovel having a groove formed in its under surface, of a cultivator point disposed in said groove flush with the surface of the shovel, a clamping plate disposed upon the shovel and point, said plate having lateral extensions integrally formed upon one end thereof, bolts disposed through said extensions and the shovel and point, securing nuts engaged upon the ends of said bolts, said clamping plate having a convexed rearwardly extending portion disposed in spaced relation to the shovel a bolt securing the rear end of the plate to the shovel, said plate having a transverse slot formed therein, the convexed portion of said plate being mounted in grooves provided in a bed plate carried by the cultivator, said shovel and point having a transverse rocking movement in the bed plate, and a bolt extending through the slot in the clamping plate and through the bed plate to secure the point in its adjusted position.

3. In a device of the class described, the combination with a cultivator shovel of a shovel point adapted to be carried thereby, said shovel having a groove formed in its under surface, said point being provided with a reduced extension adapted to be seated in said groove, a clamping plate disposed upon the point and shovel and rigidly secured thereto, a bolt disposed through the rear end of the point and the shovel, a nut threaded upon the end of said bolt, a portion of the clamping point being spaced from the shovel and having an outer convexed surface, a bed plate having a concave groove formed therein to receive the convexed portion of the attaching plate, said attaching plate being provided with a transversely positioned slot, a bolt extending therethrough and through the bed plate, the shovel and point being adapted to have a transverse rocking movement and a nut threaded upon the end of the bolt to secure the point in its adjusted position.

In testimony whereof I affix my signature, in presence of two witnesses.

THEODORE E. FRIEND.

Witnesses:
   CHAS W. AINSWORTH,
   WILLIAM E. CLEGG.